Patented Sept. 7, 1943

2,328,690

UNITED STATES PATENT OFFICE 2,328,690

COMBINED DEODORANT AND GERMICIDE AND PROCESS OF MAKING SAME

William Reginald Steele, Syracuse, N. Y., assignor to The Solvay Process Company, New York, N. Y., a corporation of New York No Drawing. Application January 20, 1940, Serial No. 314,791

12 Claims. (Cl. 167—30)

This invention relates to a combined deodorant and germicide for use in contact with foul aqueous solutions of unpleasant odor and to a method for preparing the same.

As is well known, para-dichlorobenzene has been employed extensively as a deodorant in contact with foul aqueous solutions of unpleasant odor; for example, in toilet installations. While under such conditions para-dichlorobenzene is a very efficient deodorant, it has practically no germicidal activity. It has been proposed to prepare cakes containing para-dichlorobenzene and paraformaldehyde, the paraformaldehyde lending to the composition a certain germicidal value when used in contact with foul aqueous solutions. Such cakes are ordinarily manufactured by molding a mixture of paraformaldehyde and para-dichlorobenzene under pressure. By this method, it is difficult, if not impossible, to obtain uniform distribution of the germicide throughout the cake. Furthermore, if forms prepared from such a composition contain sufficient paraformaldehyde to possess any substantial germicidal activity when used in contact with foul aqueous solutions, they disintegrate rapidly when so used because the high water solubility of the paraformaldehyde causes this component to be rapidly dissolved out of the forms, leaving a honeycomb structure that quickly crumbles; the composition thereby is rapidly washed away and its deodorizing and germicidal properties lost.

It is an object of this invention to provide an improved combined deodorant and germicide in the form of a cake which can readily be made so that the germicidal constituent is uniformly distributed throughout the cake.

In accordance with this invention a germicide, of relatively low solubility in an aqueous medium, readily or highly soluble in para-dichlorobenzene, chemically inert thereto and which does not form with para-dichlorobenzene a mixture which melts at too low a temperature, i. e. a mixture which is liquid or semi-liquid at room temperature, is dissolved in para-dichlorobenzene and the resultant solution formed into cakes having the germicidal constituents distributed uniformly therethrough. Owing to the protection of the germicide by the para-dichlorobenzene in which it is dissolved, the cake does not disintegrate when used in contact with foul aqueous solutions while substantially all or at least the major portion of the para-dichlorobenzene evaporates, the evaporation of the para-dichlorobenzene exposing the germicide to contact, either continuously or intermittently, with the foul solution, depending upon the conditions under which the cake is used. Upon contact of the germicide with the foul solution, I have found it imparts thereto its germicidal properties notwithstanding that the germicides used in accordance with this invention are of relatively low solubility in the aqueous medium.

As the germicidal constituent of the combined deodorant and germicide of this invention, I have found dichloramine-B (N,N-dichlorobenzenesulfonic acid amide), dichloramine-T (N,N-dichloro-p-toluenesulfonic acid amide), or mixtures thereof, are highly efficient. Dichloramine-B and dichloramine-T, I have found, are soluble in para-dichlorobenzene and chemically inert thereto, so that by fusing para-dichlorobenzene with one of these germicides or a mixture thereof and casting the fused mixture, it is possible to prepare a combined deodorant and germicide solid at room temperatures in which the germicide is uniformly distributed throughout the composition. However, other germicides which are soluble in para-dichlorobenzene, chemically inert thereto, form with para-dichlorobenzene mixtures solid at room temperatures and which have a water solubility comparable to that of dichloramine-B or dichloramine-T, i. e., which have a water solubility of between about 0.5 and about 0.005 gram per liter, may be used. Notwithstanding the relatively low solubility of such germicides in water, I have found that in the composition of this invention these germicides dissolved in water in sufficient amounts to furnish to the foul aqueous solution a strong germicidal action and furthermore dissolve slowly so that honeycombing of the form in which the composition is cast and consequent disintegration thereof does not take place. My improved compositions, therefore, are not disintegrated upon exposure to foul aqueous solutions by selective leaching of the germicide during evaporation of the major portion of the para-dichlorobenzene and are capable of furnishing strong deodorizing and germicidal properties to the foul aqueous solutions with which they are contacted for prolonged periods of time. Compositions prepared in accordance with this invention possess a combination of deodorizing and germicidal properties which is superior to similar compositions heretofore used in contact with foul aqueous solutions.

The compositions of my invention may be prepared by fusing para-dichlorobenzene with suitable amounts of dichloramine-B, dichloramine-T, or mixtures thereof, and casting the fused mixture into suitable forms, such as cakes. The amount of germicide mixed with the para-dichlorobenzene may vary between about 0.5% and about 15% of the total composition; preferably an amount of germicide less than about 10% of the total composition is employed, since the use of relatively large amounts of germicides in accordance with this invention which are soluble in para-dichlorobenzene lowers the melting point of the composition so that it cannot be advantageously used at relatively high temperatures. I have found that compositions containing between about 5% and about 8% dichloramine-B, dichloramine-T, or mixtures thereof, are particularly suitable for use in accordance with this invention. The compositions of my invention have been found to be stable over long periods of time and may be stored without detrimentally affecting their germicidal or deodorant properties.

The following example is illustrative of my invention. Amounts are given in parts by weight.

8 parts of dichloramine-B were fused with 92 parts of para-dichlorobenzene and the mixture was then cooled and cast into cakes. The cakes thus produced killed a healthy culture of *Es. coli* in two and one-half minutes or less when tested in accordance with the usual procedure. Pure para-dichlorobenzene, on the other hand, showed no germicidal action when tested in a similar manner. Cakes prepared as above described were immersed in water for 120 hours and did not disintegrate; on the other hand, a cake prepared by molding a mixture of 95 parts para-dichlorobenzene and 5 parts of paraformaldehyde under a pressure of 5000 pounds per square inch, when immersed in water for 24 hours, crumbled readily.

Since certain changes in carrying out the above process and certain modifications in the compositions which embody this invention may be made without departing from its scope, it is intended that all matter contained in the above description shall be interpreted as illustrative and not in a limiting sense.

I claim:

1. A combined deodorant and germicide in the form of a cake comprising a mass of para-dichlorobenzene having substantially uniformly distributed therethrough a germicide selected from the group consisting of dichloramine-B, dichloramine-T, and mixtures thereof, said cake not being disintegrated upon exposure to foul aqueous solutions by selective leaching of the germicide during evaporation of the major portion of the para-dichlorobenzene.

2. A combined deodorant and germicide in the form of a cake comprising a solid mass constituted predominantly of para-dichlorobenzene and less than about 10% of a germicide selected from the group consisting of dichloramine-B, dichloramine-T, and mixtures thereof, substantially uniformly distributed throughout the para-dichlorobenzene, said cake not being disintegrated upon exposure to foul aqueous solutions by selective leaching of the germicide during evaporation of the major portion of the para-dichlorobenzene.

3. A combined deodorant and germicide in the form of a cake comprising a solid mass constituted predominantly of para-dichlorobenzene and containing between about 5% and about 8% of a germicide selected from the group consisting of dichloramine-B, dichloramine-T, and mixtures thereof, the germicide constituent being substantially uniformly distributed throughout the para-dichlorobenzene, said cake not being disintegrated upon exposure to foul aqueous solutions by selective leaching of the germicide during evaporation of the major portion of the para-dichlorobenzene.

4. A combined deodorant and germicide in the form of a cake comprising a mass of para-dichlorobenzene and dichloramine-B, the dichloramine-B being substantially uniformly distributed throughout the para-dichlorobenzene mass, said cake not being disintegrated upon exposure to foul aqueous solutions by selective leaching of the germicide during evaporation of the major portion of the para-dichlorobenzene.

5. A combined deodorant and germicide in the form of a cake comprising a mass of para-dichlorobenzene and dichloramine-T, the dichloramine-T being substantially uniformly distributed throughout the para-dichlorobenzene mass, said cake not being disintegrated upon exposure to foul aqueous solutions by selective leaching of the germicide during evaporation of the major portion of the para-dichlorobenzene.

6. A combined deodorant and germicide in the form of a cake comprising a mixture containing about 92% para-dichlorobenzene and about 8% dichloramine-B, the dichloramine-B being substantially uniformly distributed throughout the para-dichlorobenzene mass, said cake not being disintegrated upon exposure to foul aqueous solutions by selective leaching of the germicide during evaporation of the major portion of the para-dichlorobenzene.

7. A method of preparing a combined deodorant and germicide which may be used in contact with foul aqueous solutions for prolonged periods of time without disintegration, which comprises fusing para-dichlorobenzene with a germicide selected from the group consisting of dichloramine-B, dichloramine-T, and mixtures thereof, and casting the fused mixture to form a solid mass of para-dichlorobenzene having the germicide substantially uniformly distributed therethroughout.

8. A method of preparing a combined deodorant and germicide which may be used in contact with foul aqueous solutions for prolonged periods of time without disintegration, which comprises fusing para-dichlorobenzene with an amount of a germicide selected from the group consisting of dichloramine-B, dichloramine-T, and mixtures thereof corresponding to less than about 10% of the mixture, and casting the fused mixture to form a solid mass of para-dichlorobenzene having the germicide substantially uniformly distributed therethroughout.

9. A method of preparing a combined deodorant and germicide which may be used in contact with foul aqueous solutions for prolonged periods of time without disintegration, which comprises fusing para-dichlorobenzene, dissolving therein an amount of a germicide selected from the group consisting of dichloramine-B, dichloramine-T, and mixtures thereof corresponding to between about 5% and about 8% of the mixture, and forming said mixture into a solid mass of para-dichlorobenzene having the germicide substantially uniformly distributed therethroughout.

10. A method of preparing a combined deodorant and germicide which may be used in contact with foul aqueous solutions for prolonged periods of time without disintegration, which comprises fusing para-dichlorobenzene with dichloramine-B, and casting the fused mixture to form a solid mass of para-dichlorobenzene having the dichloramine-B substantially uniformly distributed therethrough.

11. A method of preparing a combined deodorant and germicide which may be used in contact with foul aqueous solutions for prolonged periods of time without disintegration, which comprises fusing para-dichlorobenzene with dichloramine-T, and casting the fused mixture to form a solid mass of para-dichlorobenzene having the dichloramine-T substantially uniformly distributed therethroughout.

12. A method of preparing a combined deodorant and germicide which may be used in contact with foul aqueous solutions for prolonged periods of time without disintegration, which comprises fusing about 92 parts of para-dichlorobenzene with about 8 parts of dichloramine-B, and casting the fused mixture to form a solid mass of para-dichlorobenzene having the dichloramine-B substantially uniformly distributed therethroughout.

WILLIAM REGINALD STEELE.